US012639300B2

(12) United States Patent
Revach et al.

(10) Patent No.: US 12,639,300 B2
(45) Date of Patent: May 26, 2026

(54) UTILIZING LARGE LANGUAGE MODEL (LLM) IN RESPONDING TO MULTIFACETED QUERIES

(71) Applicant: GOOGLE LLC, Mountain View, CA (US)

(72) Inventors: Asaf Revach, Nordia Center District (IL); Hongrae Lee, Mountain View, CA (US); Zhengzhong Liang, Melrose, MA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/908,392

(22) Filed: Oct. 7, 2024

(65) Prior Publication Data

US 2025/0117381 A1 Apr. 10, 2025

Related U.S. Application Data

(60) Provisional application No. 63/543,417, filed on Oct. 10, 2023.

(51) Int. Cl.
*G06F 16/24* (2019.01)
*G06F 16/2453* (2019.01)
*G06F 40/40* (2020.01)

(52) U.S. Cl.
CPC .. *G06F 16/24535* (2019.01); *G06F 16/24542* (2019.01); *G06F 40/40* (2020.01)

(58) Field of Classification Search
None
See application file for complete search history.

(56) References Cited

U.S. PATENT DOCUMENTS

| | | | |
|---|---|---|---|
| 11,544,281 B2 | 1/2023 | Mitra | |
| 2006/0031216 A1* | 2/2006 | Semple | .................... G06F 16/71 |
| 2011/0119251 A1 | 5/2011 | Yu | |
| 2015/0310115 A1* | 10/2015 | Ryger | ................. G06F 16/9535 707/708 |
| 2018/0101601 A1* | 4/2018 | Brown | ................ G06F 16/3329 |

(Continued)

OTHER PUBLICATIONS

European Patent Office; International Search Report and Written Opinion issued in Application No. PCT/US2024/050348; 16 pages; dated Jan. 24, 2025.

*Primary Examiner* — Eliyah S. Harper
(74) *Attorney, Agent, or Firm* — Gray Ice Higdon

(57) ABSTRACT

Implementations leverage a generative model (e.g., a large language model (LLM)) to generate a plurality of candidate subqueries for multifaceted natural language (NL) based input, where each of the candidate subqueries is potentially directed to a facet or problem of the multifaceted NL based input. Those implementations further select, from the plurality of candidate subqueries and using one or more evaluation metrics, a subset of the candidate queries. Those implementations further, in response to selecting the subset of the candidate queries, obtain, for each of the candidate subqueries of the selected subset, at least one corresponding search result. Those implementations further generate a response to the NL based input based on the corresponding search results for the candidate subqueries of the subset, and cause the response to be rendered responsive to the NL based input.

28 Claims, 8 Drawing Sheets

(56) References Cited

U.S. PATENT DOCUMENTS

| | | | |
|---|---|---|---|
| 2021/0174204 A1* | 6/2021 | Yin | G06F 16/3344 |
| 2022/0035775 A1* | 2/2022 | Sriharsha | G06N 3/091 |
| 2022/0036002 A1* | 2/2022 | Sriharsha | G06N 20/00 |
| 2022/0036177 A1* | 2/2022 | Sriharsha | G06N 3/10 |
| 2023/0259705 A1* | 8/2023 | Tunstall-Pedoe | G06N 3/0499 |
| | | | 704/9 |
| 2023/0274086 A1* | 8/2023 | Tunstall-Pedoe | G06F 40/20 |
| | | | 704/9 |
| 2023/0274089 A1* | 8/2023 | Tunstall-Pedoe | G06F 40/40 |
| | | | 704/2 |
| 2023/0274094 A1* | 8/2023 | Tunstall-Pedoe | G06F 40/30 |
| | | | 704/9 |
| 2025/0103818 A1* | 3/2025 | Bolcer | G06F 16/3344 |

* cited by examiner

100

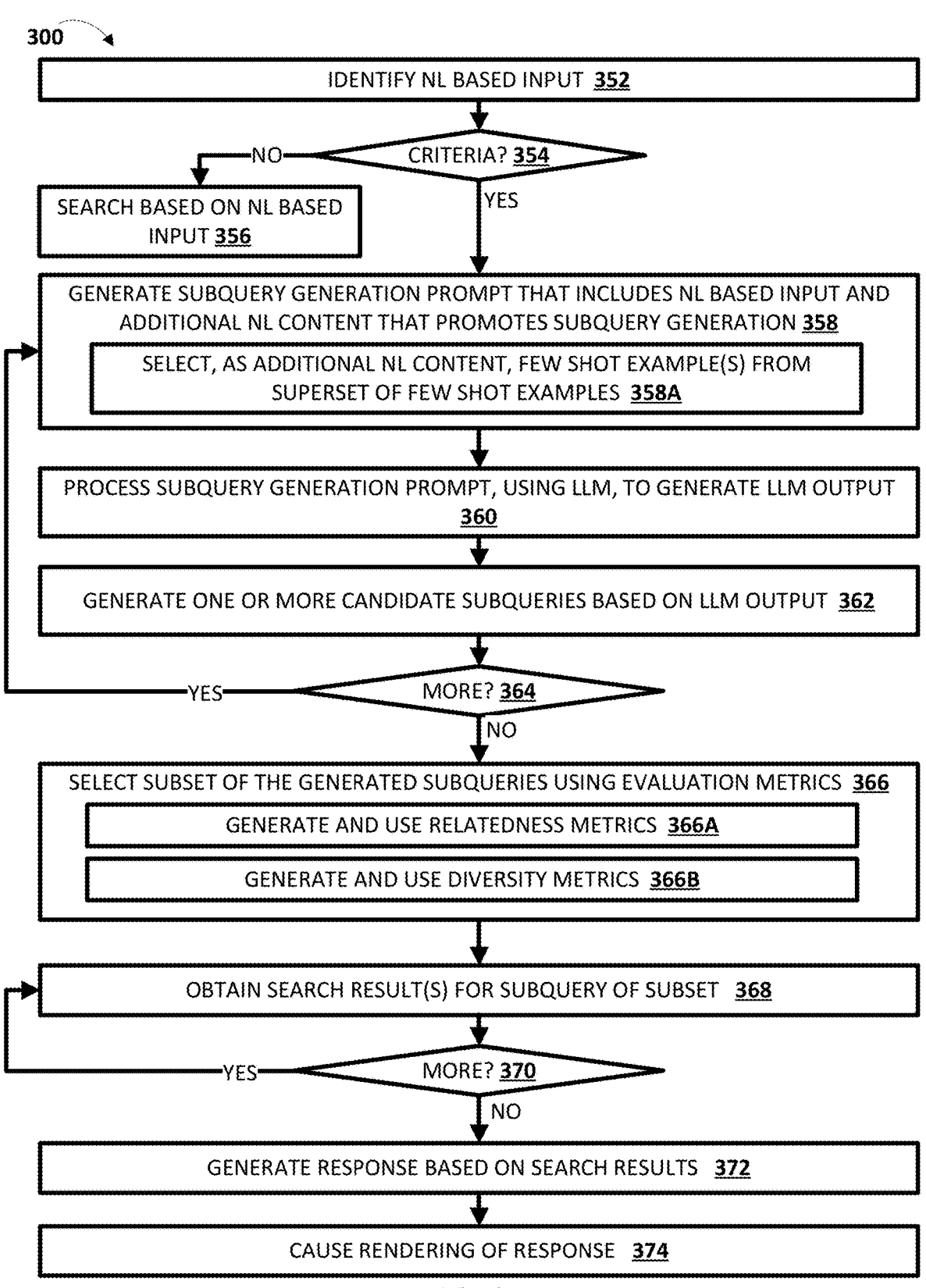

300

IDENTIFY NL BASED INPUT 352

CRITERIA? 354

NO → SEARCH BASED ON NL BASED INPUT 356

YES

GENERATE SUBQUERY GENERATION PROMPT THAT INCLUDES NL BASED INPUT AND ADDITIONAL NL CONTENT THAT PROMOTES SUBQUERY GENERATION 358

SELECT, AS ADDITIONAL NL CONTENT, FEW SHOT EXAMPLE(S) FROM SUPERSET OF FEW SHOT EXAMPLES 358A

PROCESS SUBQUERY GENERATION PROMPT, USING LLM, TO GENERATE LLM OUTPUT 360

GENERATE ONE OR MORE CANDIDATE SUBQUERIES BASED ON LLM OUTPUT 362

YES ← MORE? 364

NO

SELECT SUBSET OF THE GENERATED SUBQUERIES USING EVALUATION METRICS 366

GENERATE AND USE RELATEDNESS METRICS 366A

GENERATE AND USE DIVERSITY METRICS 366B

OBTAIN SEARCH RESULT(S) FOR SUBQUERY OF SUBSET 368

YES ← MORE? 370

NO

GENERATE RESPONSE BASED ON SEARCH RESULTS 372

CAUSE RENDERING OF RESPONSE 374

I'm moving next month ....

SHOWING RESULTS FOR SUBQUERY 1,
... AND SUBQUERY N (DERIVED FROM
INPUT)

- RESULT A
- RESULT B
- ................
- RESULT N

UTILIZING LARGE LANGUAGE MODEL (LLM) IN RESPONDING TO MULTIFACETED QUERIES

BACKGROUND

Search systems are able to determine and present useful search results for a wide variety of queries. For example, for many queries a top search result, or one or more of the top N search results, can enable efficient resolution of the query. For instance, reviewing search result(s) that are responsive to a query, and/or the underlying search result document(s), can enable efficient resolution of the query.

However, for some queries search systems are unable to determine and present useful search results. For example, search systems can fail to determine useful results for multifaceted and/or noisy queries. For instance, none of the determined results may be useful or the determined results may address only a subset of the facets of a multifaceted query. A multifaceted query is multifaceted in that it relates to two or more facets (e.g., topics or problems). A noisy query is noisy in that it includes one or more portions that are extraneous to the facets (e.g., not essential to address the facets) and that fail to characterize the facets.

As a result of search systems failing to determine useful results for multifaceted and/or noisy queries, users seeking resolution of a multifaceted query via a search system are forced to attempt to manually break the multifaceted query into multiple individual queries, formulate and submit each of those queries separately, and separately review search result(s) for those separate queries. This extends a duration with which a user interacts, via a client device, with a search engine, resulting in significant usage of battery, processor, and/or other often limited resources of the client device. As an alternative to utilization of a search system in seeking resolution of a multifaceted query, some users post the multifaceted query to a forum and await answer(s) that are formulated by other user(s) via respective other client device(s). However, formulating the post and awaiting answer(s) likewise extends a duration of user interaction with a client device in resolving the multifaceted query, resulting in significant usage of often limited resource(s) of the client device.

As a non-limiting example, assume a query of: "I'm moving to a new city and into a house that is 2,500 square feet and need to find a wireless router setup that will cover the whole house. A smart thermostat would also be ideal to replace the existing analog one, especially since the weather will be different where I'm moving. I also need a vacuum". The example query is multifaceted in that it contains a first facet or problem that is related to finding a wireless router setup appropriate for a 2,500 square foot house, a disparate second facet or problem of finding a smart thermostat, and a disparate third facet or problem of finding a vacuum. Moreover, the example query is noisy in that it contains portions that are extraneous to the facets and that fail to characterize the facets, such as "I'm moving to a new city" and "weather will be different where I'm moving". A search system, processing the entirety of the search query, can fail to determine and present useful search results. For example, the search engine can search based on the entirety of the query. This can result in returning no or only limited search result(s) that address a wireless router, a smart thermostat, and a vacuum—and any limited search result(s) can be of lower quality and/or only address each of the facets at a superficial level.

Separately, various generative models have been proposed that can be used to process natural language (NL) content and/or other input(s), to generate output that reflects generative content that is responsive to the input(s). For example, large language models (LLM(s)) have been developed that can be used to process NL content and/or other input(s), to generate LLM output that reflects NL content and/or other content that is responsive to the input(s). For instance, an LLM can be used to process NL content of "how to change DNS settings on Acme router", to generate LLM output that reflects several responsive NL sentences such as: "First, type the router's IP address in a browser, the default IP address is 192.168.1.1. Then enter username and password, the defaults are admin and admin. Finally, select the advanced settings tab and find the DNS settings section". However, current utilizations of generative models suffer from one or more drawbacks.

As one example, LLMs can be utilized as part of a text-based dialogue application, generating responses to textual inputs/queries provided by a user of the application. However, multifaceted and/or noisy inputs, can be difficult for the LLM to handle effectively. For example, processing a multifaceted and noisy NL based input, using the LLM, and using the resulting LLM output to generate a response to provide responsive to the noisy NL based input, can result in a response that is of limited usefulness. For instance, the response can fail to address all (or even any) facets of the multifaceted NL based input, resulting in a user further interacting with the LLM and/or separate search engine(s) in attempting to resolve the multifaceted NL based input. This significantly extends the duration with which a user interacts, via a client device, with an LLM and/or a search engine, resulting in significant usage of often limited resources of the client device.

SUMMARY

Implementations described herein can serve to reduce a duration of interaction, via a client device, in resolving a multifaceted and/or noisy NL based input, and reduce the duration of interaction via interacting with, and working within the technical constraints of, a generative model (e.g., an LLM) and search system(s). Some of those implementations enable generation and presentation of a response, to a single multifaceted and/or noisy NL based input (e.g., a textual query submitted via a search system interface), where the response addresses each of the multiple facets of the NL based input and/or does not address the noisy aspect(s) of the NL based input. This can enable resolution of a multifaceted and/or noisy NL based input without necessitating the NL based input be manually formulated into multiple individual queries, each of those queries be manually submitted separately, and search result(s) for those separate queries each being manually reviewed separately following a corresponding manual submission. In these and other manners, implementations can serve to reduce the duration of user interaction with a search system via a client device. Although any given user may decide, following provision of a response to a multifaceted query that is generated according to implementations disclosed herein, to provide a follow-up NL based input to a search system, an "on average" reduction in the number of follow-up NL based inputs to the search system can be significantly beneficial in terms of computational resource usage.

More specifically, implementations disclosed herein leverage an LLM or other generative model to generate a plurality of candidate subqueries for multifaceted NL based input (e.g., a textual input submitted via a search system interface), where each of the candidate subqueries is potentially directed to a facet or problem of the multifaceted NL based input. Those implementations further select, from the plurality of candidate subqueries and using one or more evaluation metrics, a subset of the candidate queries. Those implementations further, in response to selecting the subset of the candidate queries, obtain, for each of the candidate subqueries of the selected subset, at least one corresponding search result. Those implementations further generate a response to the NL based input based on the corresponding search results for the candidate subqueries of the subset, and cause the response to be rendered responsive to the NL based input.

In utilizing the LLM in generating the candidate subqueries, many implementations seek to generate a diverse group of subqueries to ensure that the generated subqueries include at least one subquery for each facet of the NL based input. For example, some implementations can generate two, three, or more subquery generation prompts that each include all or portions of the NL based input, but that each include different additional content (e.g., different few shot example(s) and/or other differing content) relative to other of the subquery generation prompts. For instance, three subquery generation prompts can be generated that each include the NL based input, but a first prompt can include first few shot example(s), a second prompt can instead include disparate second few shot example(s), and a third prompt can instead include disparate third few shot example(s). Each few shot example can include a corresponding example of multifaceted NL based input and corresponding ground truth subqueries for the multifaceted NL based input.

Continuing with the example, the first subquery generation prompt can be processed, using the LLM, to generate first LLM output and the first LLM output utilized (e.g., decoded) to determine multiple first candidate subqueries. Likewise, the second subquery generation prompt can be processed, using the LLM, to generate second LLM output and the second LLM output utilized to determine multiple second candidate subqueries. The second candidate subqueries can, due to the unique prompt, include one or more subqueries that differ from those of the first candidate subqueries. Likewise, the third subquery generation prompt can be processed, using the LLM, to generate third LLM output and the third LLM output utilized to determine multiple third candidate subqueries, one or more of which can vary from those of the first and second candidate subqueries. Accordingly, through multiple calls of the LLM based on different prompts, a large and diverse group of candidate subqueries can be generated. In addition to or instead of differing few shot example(s) of prompts, other content of the prompt(s) can be varied in one or more calls and/or LLM parameter(s) (e.g., temperature, seed, etc.) can be varied in one or more calls.

While utilizing multiple calls of the LLM can generate a large and diverse group of candidate subqueries, implementations disclosed herein also recognize that the resulting group of candidate subqueries can include one or more subqueries that are irrelevant to resolving facet(s) of the NL based input and/or can include more candidate subqueries than are needed for resolving the NL based input. Further, implementations recognize that naively obtaining search results for all of the candidate subqueries causes excessive utilization of search system resources and that incorporating all such search results in a response can require significant time to review the response and/or significant screen and/or audio resources to review the response.

Accordingly, implementations disclosed herein select a subset of the candidate subqueries utilizing one or more evaluation metrics. The evaluation metric(s) can seek to ensure that a selected subquery is relevant to the NL based input and/or that a selected subquery is not duplicative of another selected subquery. In these and other manners it can be ensured that search system resources are utilized only for selected candidate subqueries that have been objectively determined to be relevant to resolving the NL based input and that are not duplicative. This also ensure that a response, generated based on corresponding search results, can be efficiently rendered and/or efficiently reviewed.

The evaluation metric(s) that are utilized in determining whether to select a given candidate subquery for inclusion in the subset can include diversity metric(s) for the given candidate subquery and/or a relatedness metric for the given candidate subquery. The relatedness metric can indicate a degree of relatedness of the given candidate subquery to the NL based input. Each diversity metric can indicate a degree of similarity between the given candidate subquery and an already selected candidate subquery (if any). For example, in determining whether to select the given candidate subquery it can be selected only if (a) its relatedness metric satisfies a threshold (indicating relatedness to the NL based input) and (b) (i) the selected set is empty or (ii) each diversity metric, between the given candidate subquery and any already selected candidate subqueries, satisfies a threshold (indicating diversity relative to any already selected candidate subqueries).

In some implementations, an encoding neural network model (e.g., Word2Vec or other sentence encoder) can be used to process the NL based input to generate an NL based input encoding and can be used to separately process each of the candidate subqueries to generate a corresponding subquery encoding. In some of those implementations, the relatedness metric for a candidate subquery can be based on a cosine distance (and/or other distance measure(s)) between the NL based input encoding and the corresponding subquery encoding. Similarly, a diversity metric between two candidate subqueries can be based on a distance measure between the two corresponding subquery encodings. Accordingly, in those implementations the generated encodings can be used to efficiently (e.g., with a simple cross product) generate relatedness metrics and/or diversity metrics. It is noted that the encoding neural network model can be more computationally efficient than an LLM. For example, it can include 10% fewer or other percentage fewer parameters, enabling it to be loaded with less memory and/or to process given data in less processor cycles. It is further noted that N encodings, generated using the encoding neural network, can be used to generate more than N metrics—with a computationally efficient cross product or other simple distance metric. For example, an NL based input encoding, a first subquery encoding, a second subquery encoding, and a third subquery encoding can be used to generate two generate three relatedness metrics and three diversity metrics.

Some implementations can additionally or alternatively utilize an LLM to determine a relatedness metric (e.g., prompting the LLM with "on a scale of 1-10 how related is [subquery] to [NL based input]) and/or a diversity metric (e.g., prompting the LLM with" is [candidate prompt] sufficiently diverse relative to [already selected prompt(s)]). However, various implementations can at least selectively (e.g., when server load is high) utilize the encoding neural network model techniques described herein to lessen an extent of computational resource utilization and/or to reduce latency.

Implementations obtain search results for only subqueries of the selected subset, and generate a response, to the NL based input, based on those search results. For example, top ranked search result(s) for each subquery can be obtained, and the response can be generated based on the top ranked search results for the subqueries. As one example, the response can include each subquery and, below each subquery, can include the top ranked search result(s) for the subquery. As another example, the response can include the top ranked search results for the subqueries, optionally without any indication of the subqueries or without any indication of which subqueries respond to which results. As yet another example, the response can be a shortened summary of the top ranked search results, such as a shortened summary that is generated based on processing, using an LLM, each of the search results along with a summarization prompt (e.g., "generate a summary of [search results]").

In some implementations, before generating and executing multiple subqueries for an NL based input, it is first determined, based on one or more criteria for the NL based input, whether to do so (e.g., as opposed to only submitting the NL based input, in its entirety, to a search system). The one or more criteria can seek to ensure that generation and/or execution of multiple search queries is not performed in situations where the search system is able to generate a helpful response to the NL based input in its entirety. Put another way, the one or more criteria seek to ensure that generation and/or execution of multiple search queries is performed when beneficial (and corresponding technical benefits achieved), but not needlessly performed when not beneficial. In some of those implementations, the one or more criteria can include criteria based on, for example, a length of the NL based input, a frequency of submission of all or portion(s) of the NL based input, quality score(s) and/or other metric(s) for search result(s) for the NL based input as a whole, current server load, and/or other criteria. For example, generating and executing of multiple subqueries can occur for a given NL based input based on the given NL based input having a length that is greater than a threshold, being submitted less than a threshold frequency, and/or having results that are of low quality. As another example, generating and executing of multiple subqueries can occur for a given NL additionally or alternatively based input based on current server load being less than a threshold.

In some implementations, an LLM or other generative model can include at least hundreds of millions of parameters. In some of those implementations, the generative model includes at least billions of parameters, such as one hundred billion or more parameters. In some additional or alternative implementations, a generative model is a sequence-to-sequence model, is Transformer-based, and/or can include an encoder and/or a decoder (e.g., a decoder-only generative model). One non-limiting example of an LLM is GOOGLE'S Pathways Language Model (PaLM). Another non-limiting example of an LLM is GOOGLE'S Language Model for Dialogue Applications (LaMDA). Yet another non-limiting example of generative models are GOOGLE'S suite of Gemini models. However, and as noted, it should be noted that the LLMs described herein are one example of generative machine learning models are not intended to be limiting.

The preceding is presented as an overview of only some implementations disclosed herein. These and other implementations are disclosed in additional detail herein.

BRIEF DESCRIPTION OF THE DRAWINGS

FIG. 3 depicts a flowchart illustrating an example method of generating a response to an NL based input, in accordance with various implementations.

DETAILED DESCRIPTION OF THE DRAWINGS

Figure 1:
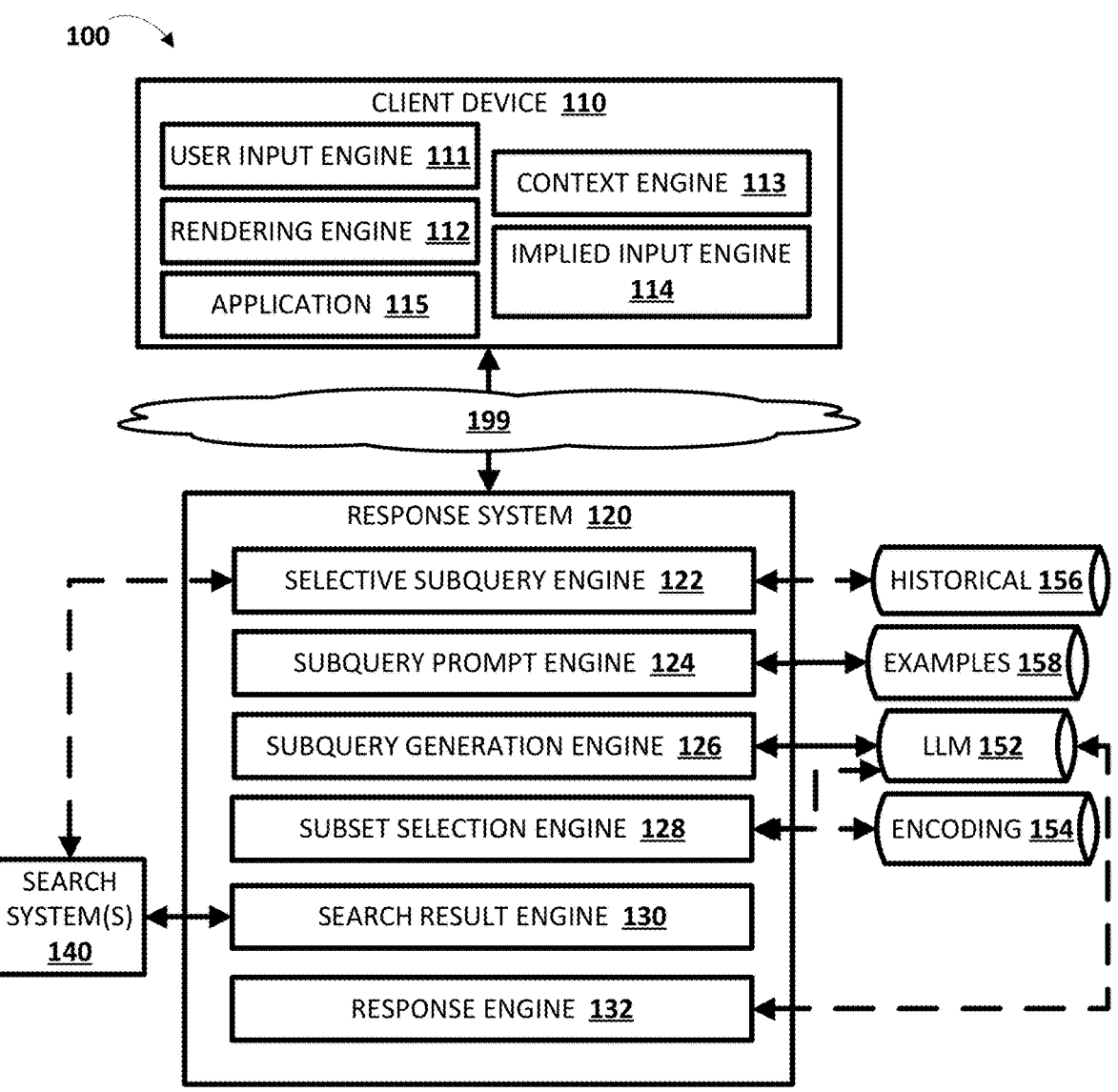
FIG. 1 depicts a block diagram of an example environment that demonstrates various aspects of the present disclosure, and in which some implementations disclosed herein can be implemented.

Turning now to FIG. 1, a block diagram of an example environment that demonstrates various aspects of the present disclosure, and in which implementations disclosed herein can be implemented is depicted. The example environment includes a client device 110 and a response system 120.

In some implementations, all or some aspects of the response system 120 can be implemented locally at the client device 110. In additional or alternative implementations, all or some aspects of the response system 120 can be implemented remotely from the client device 110 as depicted in FIG. 1 (e.g., at remote server(s)). In those implementations, the client device 110 and the response system 120 can be communicatively coupled with each other via one or more networks 199, such as one or more wired or wireless local area networks ("LANs," including Wi-Fi, mesh networks, Bluetooth, near-field communication, etc.) or wide area networks ("WANs", including the Internet).

The client device 110 can be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

The client device 110 can execute one or more software applications, via application engine 115, through which NL based input can be submitted and/or NL based output and/or other output that is responsive to the NL based input can be rendered (e.g., audibly and/or visually). The application engine 115 can execute one or more software applications that are separate from an operating system of the client device 110 (e.g., one installed "on top" of the operating system)—or can alternatively be implemented directly by the operating system of the client device 110. For example, the application engine 115 can execute a web browser or automated assistant installed on top of the operating system of the client device 110. As another example, the application engine 115 can execute a web browser software application or automated assistant software application that is integrated as part of the operating system of the client device 110. The application engine 115 (and the one or more software applications executed by the application engine 115) can interact with the response system 120.

In various implementations, the client device 110 can include a user input engine 111 that is configured to detect user input provided by a user of the client device 110 using one or more user interface input devices. For example, the client device 110 can be equipped with one or more microphones that capture audio data, such as audio data corresponding to spoken utterances of the user or other sounds in an environment of the client device 110. Additionally, or alternatively, the client device 110 can be equipped with one or more vision components that are configured to capture vision data corresponding to images and/or movements (e.g., gestures) detected in a field of view of one or more of the vision components. Additionally, or alternatively, the client device 110 can be equipped with one or more touch sensitive components (e.g., a keyboard and mouse, a stylus, a touch screen, a touch panel, one or more hardware buttons, etc.) that are configured to capture signal(s) corresponding to touch input directed to the client device 110.

Some instances of an NL based input described herein can be a query for an NL response that is formulated based on user input provided by a user of the client device 110 and detected via user input engine 111. For example, the query can be a typed query that is typed via a physical or virtual keyboard, a suggested query that is selected via a touch screen or a mouse of the client device 110, a spoken voice query that is detected via microphone(s) of the client device 110 (and optionally directed to an automated assistant executing at least in part at the client device 110), or an image or video query that is based on vision data captured by vision component(s) of the client device 110 (or based on NL input generated based on processing the image using, for example, object detection model(s), captioning model(s), etc.).

In various implementations, the client device 110 can include a rendering engine 112 that is configured to render content (e.g., response(s)) for audible and/or visual presentation to a user of the client device 110 using one or more user interface output devices. For example, the client device 110 can be equipped with one or more speakers that enable the content to be provided for audible presentation to the user via the client device 110. Additionally, or alternatively, the client device 110 can be equipped with a display or projector that enables the content to be provided for visual presentation to the user via the client device 110.

In various implementations, the client device 110 can include a context engine 113 that is configured to determine a context (e.g., current or recent context) of the client device 110 and/or of a user of the client device 110 (e.g., an active user of the client device 110 when the client device 110 is associated with multiple users). In some of those implementations, the context engine 113 can determine a context based on, for example, user interaction data that characterizes current or recent interaction(s) of the client device 110 and/or a user of the client device 110, location data that characterizes a current or recent location(s) of the client device 110 and/or a user of the client device 110, user attribute data that characterizes one or more attributes of a user of the client device 110, user preference data that characterizes one or more preferences of a user of the client device 110, user profile data that characterizes a profile of a user of the client device 110, third party (3P) data which is indicative of one or more response evaluation criteria defined by a 3P and/or any other data accessible to the context engine 113 via the client device data database 110A or otherwise.

For example, the context engine 113 can determine a current context based on a current state of a dialog session (e.g., considering one or more recent inputs provided by a user during the dialog session), profile data, and/or a current location of the client device 110. For instance, the context engine 113 can determine a current context of "best landmarks to visit in London" based on a recently issued query, profile data, and/or a current or an anticipated future location of the client device 110 (e.g., based on calendar information associated with the user accessible to the context engine 113). As another example, the context engine 113 can determine a current context based on which software application is active in the foreground of the client device 110, a current or recent state of the active software application, and/or content currently or recently rendered by the active software application. A context determined by the context engine 113 can be utilized, for example, in supplementing or rewriting NL based input that is formulated based on user input, in generating an implied NL based input (e.g., an implied query or prompt formulated independent of any explicit NL based input provided by a user of the client device 110), and/or in determining to submit an implied NL based input and/or to render result(s) (e.g., an NL based output) for an implied NL based input.

In various implementations, the client device 110 can include an implied input engine 114 that is configured to: generate an implied NL based input independent of any user explicit NL based input provided by a user of the client device 110; submit an implied NL based input, optionally independent of any user explicit NL based input that requests submission of the implied NL based input; and/or cause rendering of response(s) for the implied NL based input, optionally independent of any explicit NL based input that requests rendering of the response(s). For example, the implied input engine 114 can use one or more past or current contexts, from the context engine 113, in generating an implied NL based input, determining to submit the implied NL based input, and/or in determining to cause rendering of response(s) that is responsive to the implied NL based input. For instance, the implied input engine 114 can automatically generate and automatically submit an implied query or implied prompt based on the one or more past or current contexts. Further, the implied input engine 114 can automatically push the response(s) that is generated responsive to the implied query or implied prompt to cause them to be automatically rendered or can automatically push a notification of the response(s), such as a selectable notification that, when selected, causes rendering of the response(s). Additionally, or alternatively, the implied input engine 114 can submit respective implied NL based input at regular or non-regular intervals, and cause respective response(s) to be automatically provided (or a notification thereof automatically provided). For instance, the implied NL based input can be "automated assistant news" based on the one or more past or current contexts indicating a user's general interest in automated assistants, the implied NL based input or a variation thereof periodically submitted, and the respective response(s) can be automatically provided (or a notification thereof automatically provided). It is noted that the respective response(s) can vary over time in view of, e.g., presence of new/fresh search result document(s) over time.

Further, the client device 110 and/or the response system 120 can include one or more memories for storage of data and/or software applications, one or more processors for accessing data and executing the software applications, and/or other components that facilitate communication over one or more of the networks 199. In some implementations, one or more of the software applications can be installed locally at the client device 110, whereas in other implementations one or more of the software applications can be hosted remotely (e.g., by one or more servers) and can be accessible by the client device 110 over one or more of the networks 199.

Although aspects of FIG. 1 are illustrated or described with respect to a single client device having a single user, it should be understood that is for the sake of example and is not meant to be limiting. For example, one or more additional client devices of a user and/or of additional user(s) can also implement the techniques described herein. For instance, the client device 110, the one or more additional client devices, and/or any other computing devices of a user can form an ecosystem of devices that can employ techniques described herein. These additional client devices and/or computing devices can be in communication with the client device 110 (e.g., over the network(s) 199). As another example, a given client device can be utilized by multiple users in a shared setting (e.g., a group of users, a household, a workplace, a hotel, etc.).

The response system 120 is illustrated in FIG. 1 as including a selective subquery engine 122, a subquery prompt engine 124, a subquery generation engine 126, a subset selection engine 128, a search result engine 130, and a response engine 132. Some of these engines can be combined and/or omitted in various implementations. Further, these engines can include various sub-engines. Accordingly, it should be understood that the various engines of the response system 120 illustrated in FIG. 1 are depicted for the sake of describing certain functionalities and is not meant to be limiting.

As described in more detail herein, the response system 120 can be utilized to: generate a plurality of candidate subqueries for multifaceted NL based input (e.g., submitted via client device 110); select, from the plurality of candidate subqueries and using one or more evaluation metrics, a subset of the candidate queries; in response to selecting the subset of the candidate queries, obtain, for each of the candidate subqueries of the selected subset, at least one corresponding search result; generate a response to the NL based input based on the corresponding search results for the candidate subqueries of the subset; and cause the response to be rendered (e.g., at the client device) responsive to the NL based input.

The selective subquery engine 122 can determine, for an NL based input, whether one or more of the other engines 124-132 should be utilized. Put another way, the selective subquery engine can consider one or more criteria, for the NL based input, in determining whether some or all of the other engines 124-132 should be utilized in processing the NL based input or, instead, the NL based input should be processed by the search system(s) 140 without e.g., generation of candidate subqueries, without selection of a subset of those candidate subqueries, and/or without obtaining any search result(s) for the selected subset. The criteria considered by the selective subquery engine 122 can include criteria based on historical data 156, such as historical data that reflects a count and/or a frequency of prior submissions of all or portion(s) of the NL based input. The criteria considered by the selective subquery engine 122 can additionally or alternatively include criteria provided by one or more search system(s) based on the NL input, such as quality criteria that reflect the quality of search result(s) for the NL based input.

The subquery prompt engine 124 can generate, for an NL based input, one or more subquery generation prompts. In doing so, the subquery prompt engine 124 can optionally utilize examples database 156, which can include multiple examples that each include a corresponding multifaceted and/or noisy NL based input and corresponding ground truth subqueries. When the subquery prompt engine 124 generates multiple prompts for an NL based input, each of the generated prompts can vary from each other of the generated prompts. For example, each of the generated prompts can include a unique set of few shot example(s) relative to all other of the generated prompts.

The subquery generation engine 126 can generate, for an NL based input, multiple candidate subqueries. In generating candidate subqueries, the subquery generation engine 126 can process a corresponding prompt, generated by subquery prompt engine 124, using LLM 152 to generate LLM output, and can determine the candidate subqueries based on the LLM output. When multiple prompts are provided for an NL based input, the subquery generation engine 126 can perform multiple iterations of processing, each using the LLM and a different one of the prompts, generating multiple of the candidate subqueries based on the LLM output at each iteration.

The subset selection engine 128 selects, from the plurality of candidate subqueries generated by subquery generation engine 126, a subset of the candidate subqueries. In doing so, the subset selection engine can use one one or more evaluation metrics, such as a relatedness metrics and/or a diversity metrics described herein. Optionally, in generating the metrics, the subset selection engine 128 can leverage an encoding neural network model 154 and/or the LLM 152.

The search result engine 130, for each of the subqueries of the subset selected by subset selection engine 128, interacts with search system(s) 140 to obtain result(s) for the subquery. For example, the search result engine 130 can obtain a top result, the top N results, or any result(s) having a quality score (and/or other score(s)) above a threshold.

The response engine 132 generates a response, to the NL based input, using the results obtained by the search result engine 130.

Figure 2:
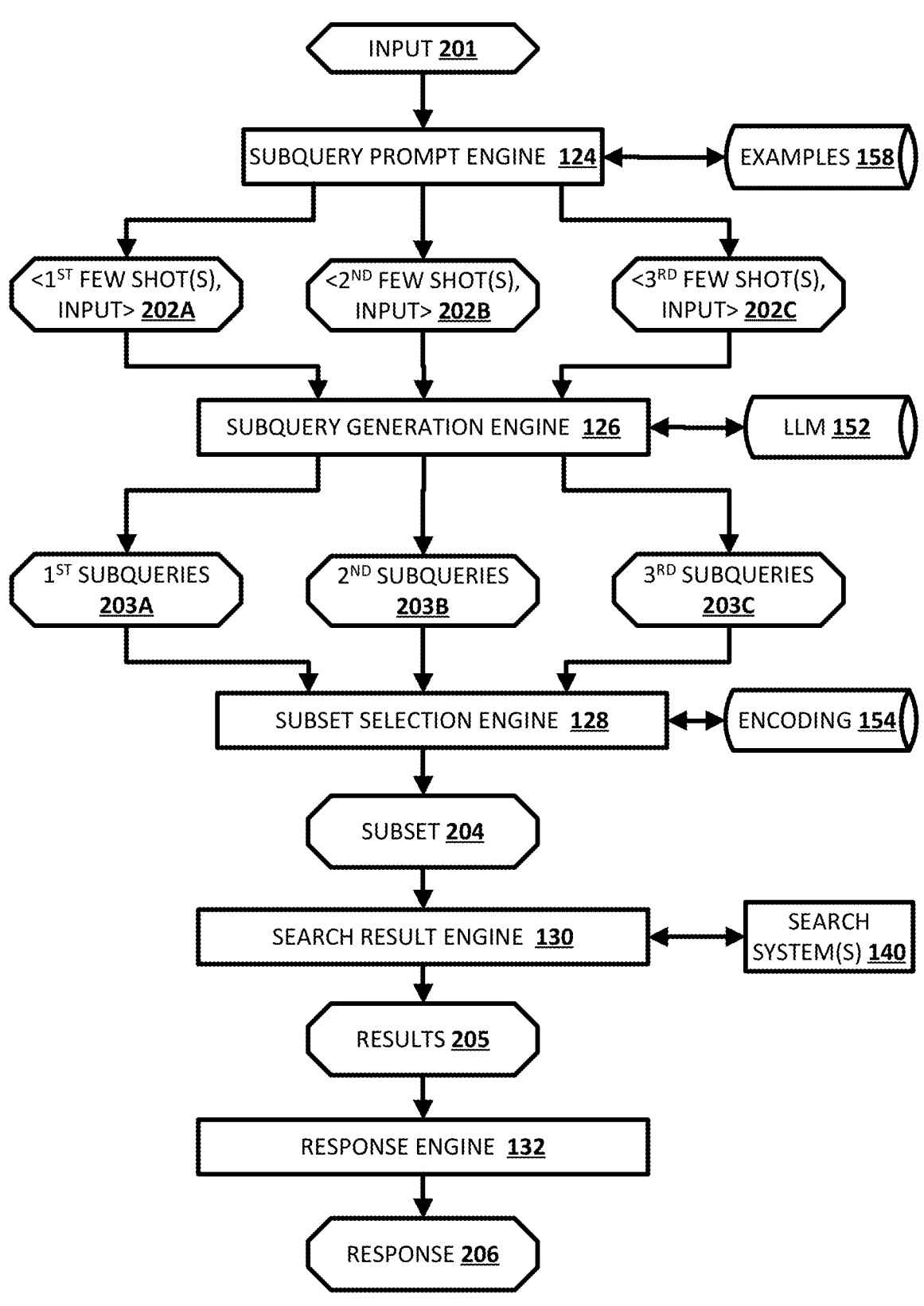
FIG. 2 depicts an example of how various engines of FIG. 1 can interact in generating a response to a natural language (NL) based input, in accordance with various implementations.

Turning now to FIG. 2, an example of how various engines of FIG. 1 can interact in generating a response 206 to a natural language (NL) based input 201, in accordance with various implementations, is depicted.

The subquery prompt engine 124 utilizes the input 201, and examples database 158 to generate three subquery generation prompts 202A, 202B, and 202C. Each of the subquery generation prompts 202A, 202B, and 202C include the input 201. However, prompt 202A includes first few shot example(s), whereas prompt 202B instead includes disparate second few shot example(s), and prompt 202C instead includes disparate third few shot example(s).

The subquery generation engine 126 performs three iterations of processing (optionally in parallel), using the LLM, with each iteration processing a different one of the subquery generation prompts 202A, 202B, and 202C. In a first iteration of processing prompt 202A, the subquery generation engine 126 generates first subqueries 203A based on the LLM output from the first iteration. In a second iteration of processing prompt 202B, the subquery generation engine

126 generates second subqueries 203B based on the LLM output from the second iteration. In a third iteration of processing prompt 202C, the subquery generation engine 126 generates third subqueries 203C based on the LLM output from the third iteration.

The subset selection engine 128 selects, from the first, second, and third subqueries 203A-C, a subset 204 of the subqueries. In selecting the subset 204, the subset selection engine 128 can consider relatedness metrics and/or diversity metrics described herein, and can optionally utilize embeddings, generated using encoding neural network model 154, in generating the metrics. For example, the subset selection engine 128 can process the subqueries 203A-C, one-by-one, and add a subquery to the subset 204 if its relatedness metric satisfies a threshold indicative of relatedness and if diversity metric(s), for the subquery and relative to any of the subqueries already added to the subset 204, satisfy a threshold indicative of diversity.

The search result engine 130 interacts with search system(s) 140 to obtain, for each of the subqueries of the subset, one or more corresponding results, and provides the collective results 205 to the response engine 132.

The response engine 132 generates a response 206 based on the results 205.

FIG. 3 depicts a flowchart illustrating an example method of generating a response to an NL based input, in accordance with various implementations. For convenience, the operations of the method 300 are described with reference to a system that performs the operations. This system of the method 300 includes one or more processors, memory, and/or other component(s) of computing device(s) (e.g., client device 110, response system 120, computing device 610, one or more servers, and/or other computing devices). Moreover, while operations of the method 300 are shown in a particular order, this is not meant to be limiting. One or more operations may be reordered, omitted, and/or added.

At block 352, the system identifies an NL based input, such as an NL based input formulated based on user interface input at a client device.

At block 354, the system determines whether one or more criteria, for generating and executing multiple subqueries, are satisfied. Such criteria can include, for example, whether the NL based input is of a threshold length, is of a threshold complexity, is rare, has never been observed, and/or other criterion/criteria.

If, at block 354, the system determines the criteria are not satisfied, the system proceeds to block 356 and a search is performed based on the NL based input, without performing any other blocks of method 300. However, if the system determines at block 354 that the criteria are satisfied, the system proceeds to block 358.

At block 358, the system generates a subquery generation prompt that includes the NL based input (e.g., the entirety thereof or at least portions thereof) and that includes additional NL content that promotes subquery generation. The additional NL content that promotes subquery generation can include few shot example(s) and/or verbiage such as "break the following into simple pertinent questions". In some implementations, block 358 includes sub-block 358A in which the system selects, as all or part of the additional NL content, one or more few shot examples from a superset of curated few shot examples. In some versions of those implementations, the selection can be random (e.g., truly random or pseudo-random). In some other of those versions the selection can be guided based on, for example, similarity measures (e.g., embedding-wise) between the NL based input and the curated few shot examples.

At block 360, the system processes the subquery generation prompt, using an LLM, to generate LLM output.

At block 362, the system generates one or more candidate subqueries based on the LLM output. For example, the system can perform one or more decodings of the LLM output to generate the candidate subqueries. For example, some of the candidate subqueries can be generated based on a greedy decoding of the LLM output and other of the candidate subqueries can be generated based on an alternative decoding of the LLM output.

At block 364, the system determines whether to generate more subquery generation prompts for the NL based input. In some implementations, this can be based on whether a threshold quantity of subquery generation prompts has been generated. The threshold can be a fixed value, such as three, or can vary. The variance can be based on, for example, length and/or complexity of the NL based input (higher threshold with higher length and/or higher complexity) or server load (higher threshold with reduced server load). For example, the threshold can be a first fixed value when server load is within a first range, a second fixed value when the server load is within a second range, and/or a third fixed value when the server load is within a third range. For instance, the first fixed value can be less than the second fixed value which can be less than the third fixed value, and the first range can indicate higher load than the second range which can indicate higher load than the third range.

If the decision at block 364 is yes, an additional subquery generation prompt is generated at block 358, and additional candidate subqueries generated based thereon at block 360 and 362. It is noted that, although depicted serially in FIG. 3 for convenience, multiple iterations of blocks 358, 360, and 362 can be performed in parallel for a given NL based input.

Figure 4:
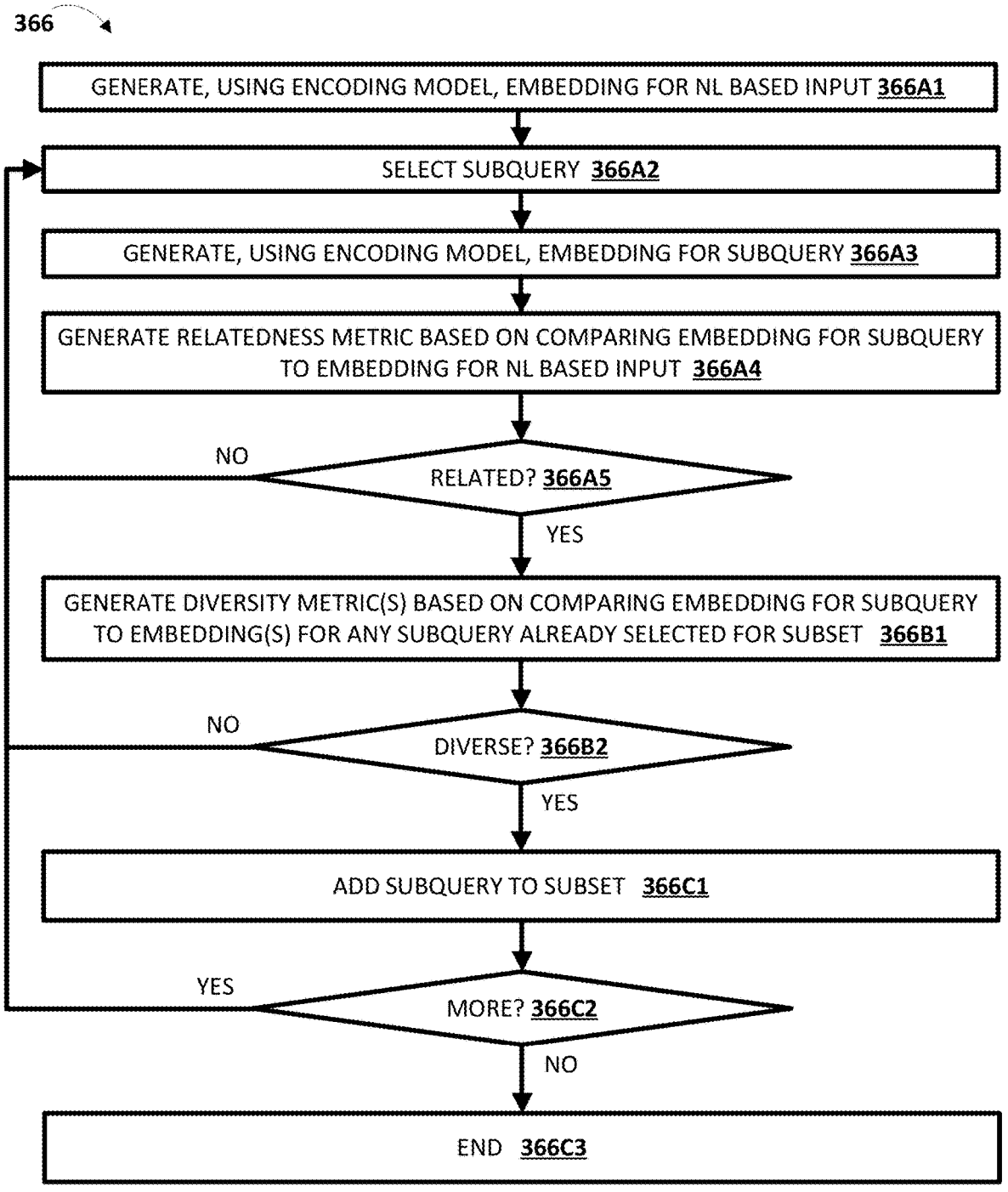
FIG. 4 depicts a flowchart illustrating an example of block 366 of FIG. 3, in accordance with various implementations.

If the decision at block 364 is no, the system proceeds to block 366. At block 366, the system selects a subset of the generated subqueries, generated at iteration(s) of block 362, using evaluation metrics. In some implementations, block 366 includes sub-block 366A in which the system generates and uses relatedness metrics in selecting the subset. In some implementations, block 366 includes sub-block 366B in which the system additionally or alternatively generates and uses diversity metrics in selecting the subset. FIG. 4 is described below and depicts a flowchart illustrating an example of block 366 of FIG. 3, in accordance with various implementations.

At block 368, the system obtains one or more search results for a subquery of the subset selected at block 366.

At block 370, the system determines whether there is an unprocessed subquery in the subset. If so, the system proceeds back to block 368 and obtains search result(s) for that unprocessed query. If not, the system proceeds to block 372. It is noted that, although depicted serially in FIG. 3 for convenience, multiple iterations of blocks 368 and 370 can be performed in parallel to simultaneously retrieve search results for all subqueries of the subset.

At block 372, the system generates a response based on the search results obtained through multiple iterations of block 368.

At block 374, the system causes rendering of the response. For example, when the NL based input is received via a request from a client device, the system can cause the response to be rendered at the client device in response to the request.

Turning to FIG. 4, a flowchart is illustrated that depicts an example of block 366 of FIG. 3, in accordance with various implementations.

At block 366A1, the system generates, using an encoding model, and embedding for the NL based input of block 352 (FIG. 3).

At block 366A2, the system selects an unprocessed subquery, of those generated in iteration(s) of block 362 (FIG. 3).

At block 366A3, the system generates, using the encoding model, an embedding for the selected subquery.

At block 366A4, the system generates a relatedness metric based on comparing the embedding for the subquery to the embedding for the NL based input.

At block 366A5, the system determines, based on the relatedness metric, whether the selected subquery is sufficiently related to the NL based input. For example, the system can determine whether the diversity metric satisfies a threshold. If the decision at block 366A5 is that it is not related, the selected query is discarded and not added to the subset. If the decision at block 366A5 is that it is related, the system proceeds to block 366B1.

At block 366B1, the system generates diversity metric(s), for the selected subquery. Each diversity metric is based on comparing the embedding, for the selected subquery, to a corresponding embedding for a corresponding subquery that has already been selected for inclusion in the subset (e.g., at a prior iteration of 366C1). For example, if three subqueries are already included in the subset, three diversity metrics can be generated. If the subset is empty, a default diversity metric that indicates diversity is present can be used.

At block 366B2, the system determines, based on the diversity metric(s), whether the selected subquery is diverse relative to all other (if any) subqueries already included in the subset. For example, the system can determine whether the diversity metrics all satisfy a threshold. If the decision at block 366A5 is that it is not diverse, the selected query is discarded and not added to the subset. If the decision at block 366A5 is that it is related, the system proceeds to block 366C1 and adds the selected subquery to the subset.

The system proceeds to block 366C2 and determines whether there are unprocessed subqueries. If so, the system proceeds back to block 366A2 and selects an unprocessed subquery. If not, the system proceeds to block 366C3 and subset selection ends.

Figure 5A:
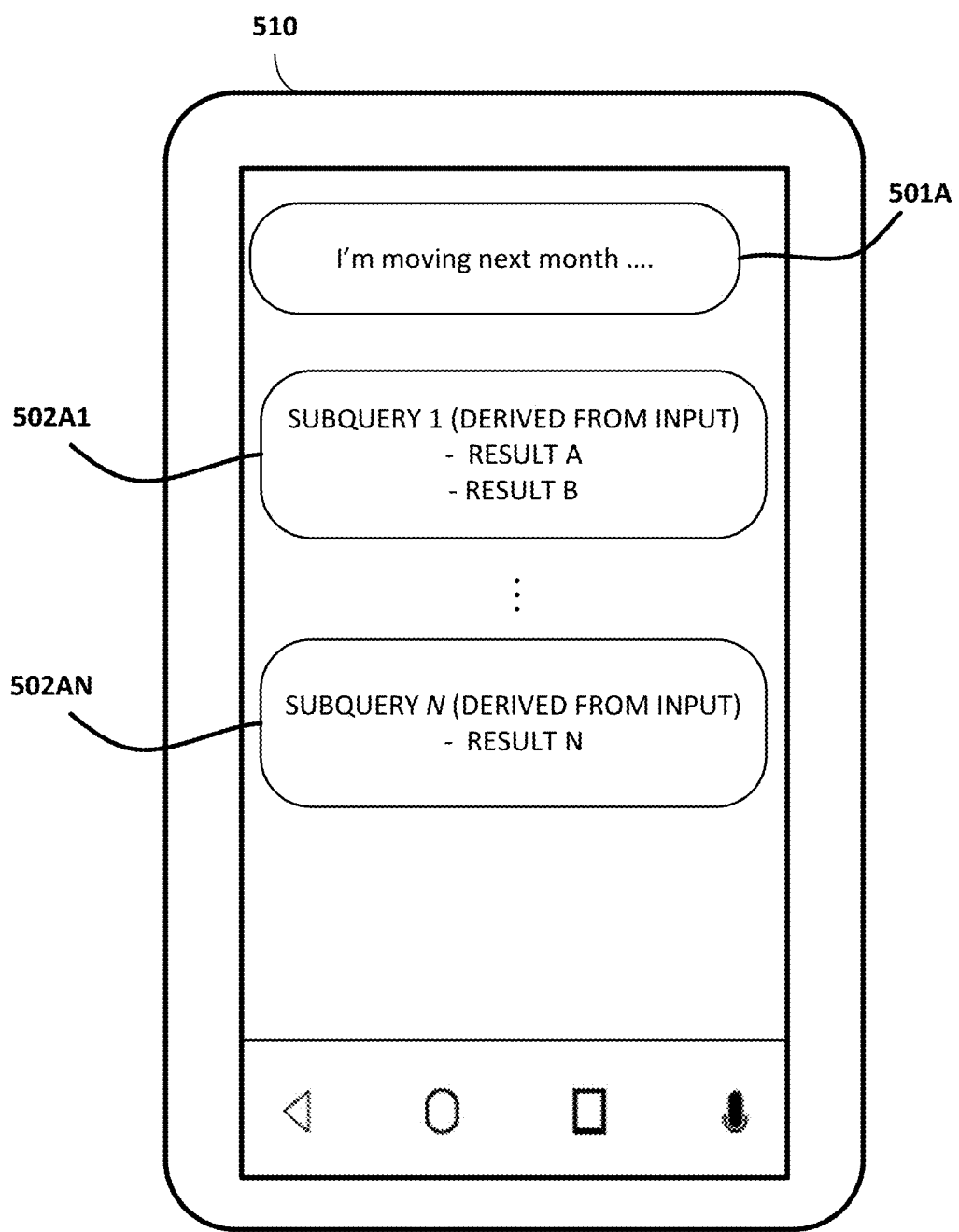
FIG. 5A, FIG. 5B, and FIG. 5C depict an example client device rendering a graphical interface that includes different examples of a response that can be generated in accordance with various implementations.
Figure 5B:
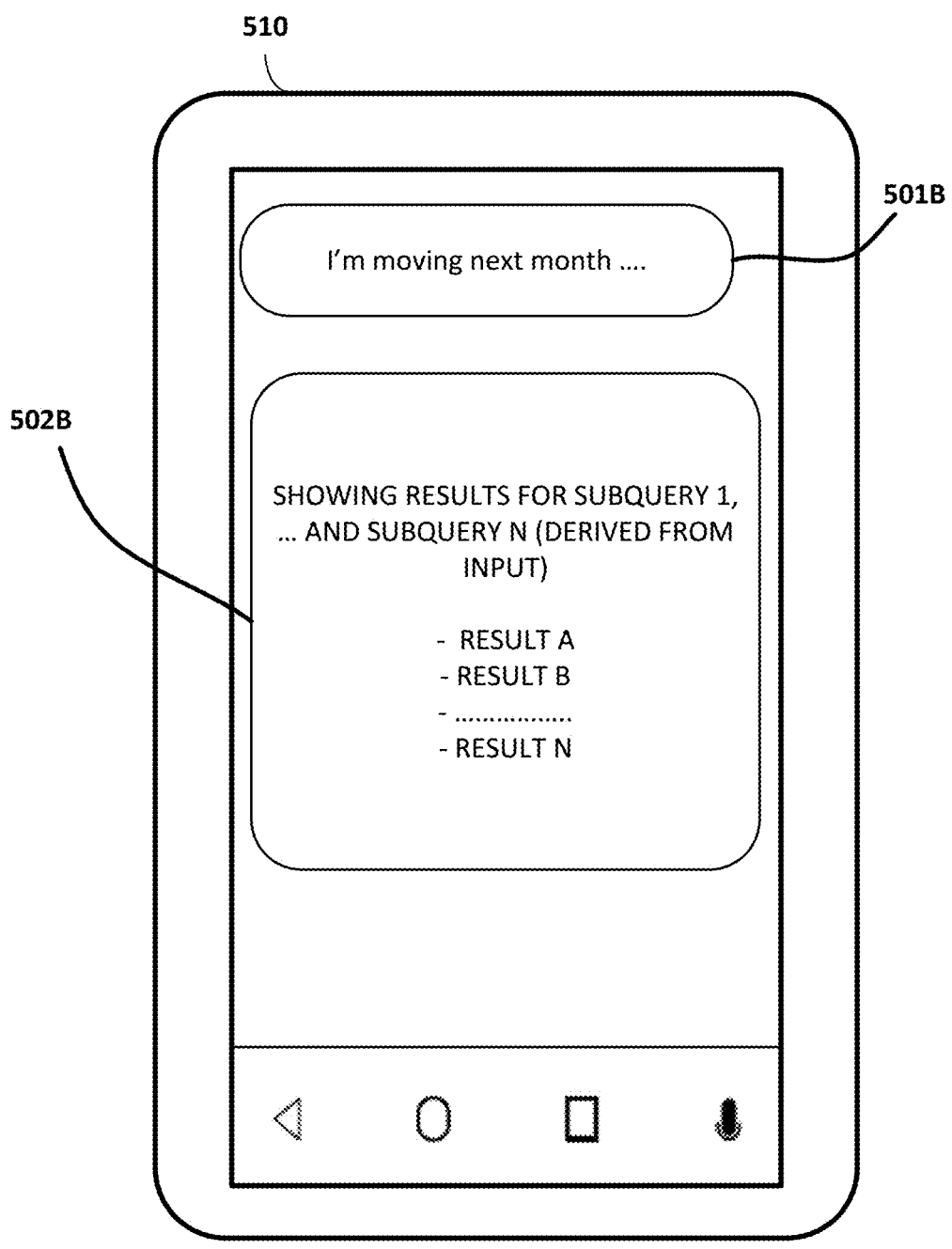
Figure 5C:
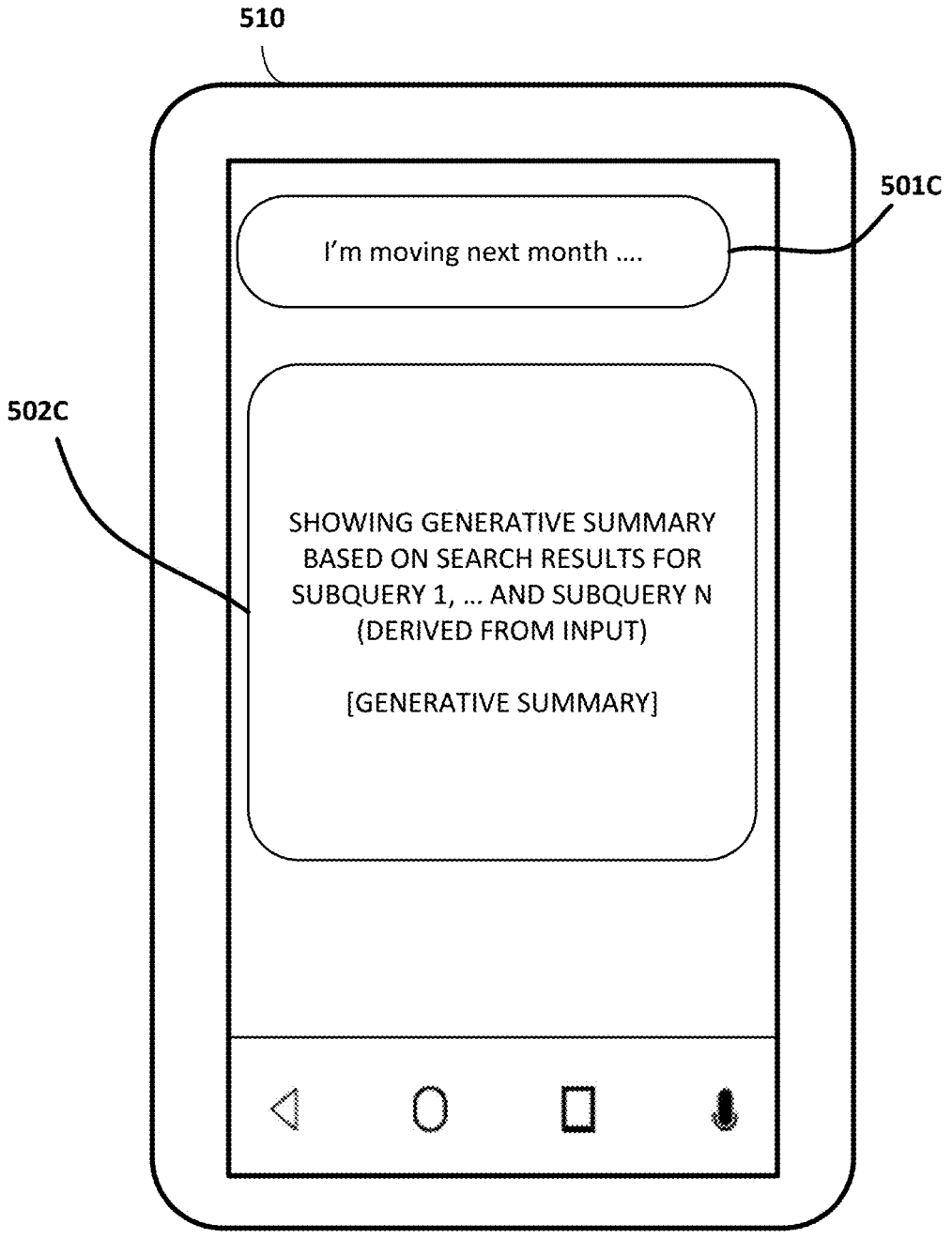

Turning now to FIGS. 5A, 5B, and 5C, each depicts an example client device 510 rendering a graphical interface that includes different examples of a response that can be generated in accordance with various implementations. For example, a response generated in block 372 (FIG. 3) and rendered based on block 374 (FIG. 3) can optionally be of a type illustrated in FIG. 5A, FIG. 5B, or FIG. 5C.

In FIG. 5A, an NL based input 501A has been provided, only a portion of which is shown. The response in FIG. 5A that is generated according to implementations disclosed herein includes a first area 502A1 that shows a first subquery, of a selected subset determined according to implementations disclosed herein, and includes two search results (A and B) for the first subquery. The first area 502A1 includes the first subquery and reflects that the results (A and B) are responsive to the first subquery. Accordingly, a reviewing user can easily ascertain both a subquery of the subset as well as ascertain the result(s) that are associated with that subquery. The response in FIG. 5A that is generated according to implementations disclosed herein includes a second area 502A2 that shows a second subquery, of a selected subset determined according to implementations disclosed herein, and includes one search result (N) for the second subquery. The second area 502A2 includes the second subquery and denotes that the result (N) is responsive to the second subquery. Additional areas for additional subqueries, and their respective results, can optionally be provided as indicated by the vertical ellipsis in FIG. 5A.

In FIG. 5B, an NL based input 501B has been provided, only a portion of which is shown. The response in FIG. 5B that is generated according to implementations disclosed herein includes only a single area 502B that shows multiple subqueries, of a selected subset determined according to implementations disclosed herein, and search results for those selected subqueries. Accordingly, a reviewing user can easily ascertain the subqueries of the subset as well as ascertain the results that are associated with those subqueries. However, unlike FIG. 5A, there is no indication of the correlation between results and the corresponding query to which they are responsive. Put another way, while the user is able to ascertain the subqueries of the subset and results for those subqueries, the reviewing user is unable to ascertain which results are paired with which subqueries.

In FIG. 5C, an NL based input 501C has been provided, only a portion of which is shown. The response in FIG. 5C that is generated according to implementations disclosed herein includes only a single area 502C that shows multiple subqueries, of a selected subset determined according to implementations disclosed herein, and shows a generative summary generated based on search results for those selected subqueries. The generative summary can be generated, for example, by processing content of those search results using an LLM and along with a prompt requesting summarization. Accordingly, a reviewing user can easily ascertain the subqueries of the subset as well as ascertain a summary of the results that are associated with those subqueries. However, unlike FIG. 5B the results are not separately delineated. Rather, just a combined summary of the results is provided. Moreover, unlike FIG. 5A, there is no indication of the correlation between results and the corresponding query to which they are responsive.

Figure 6:
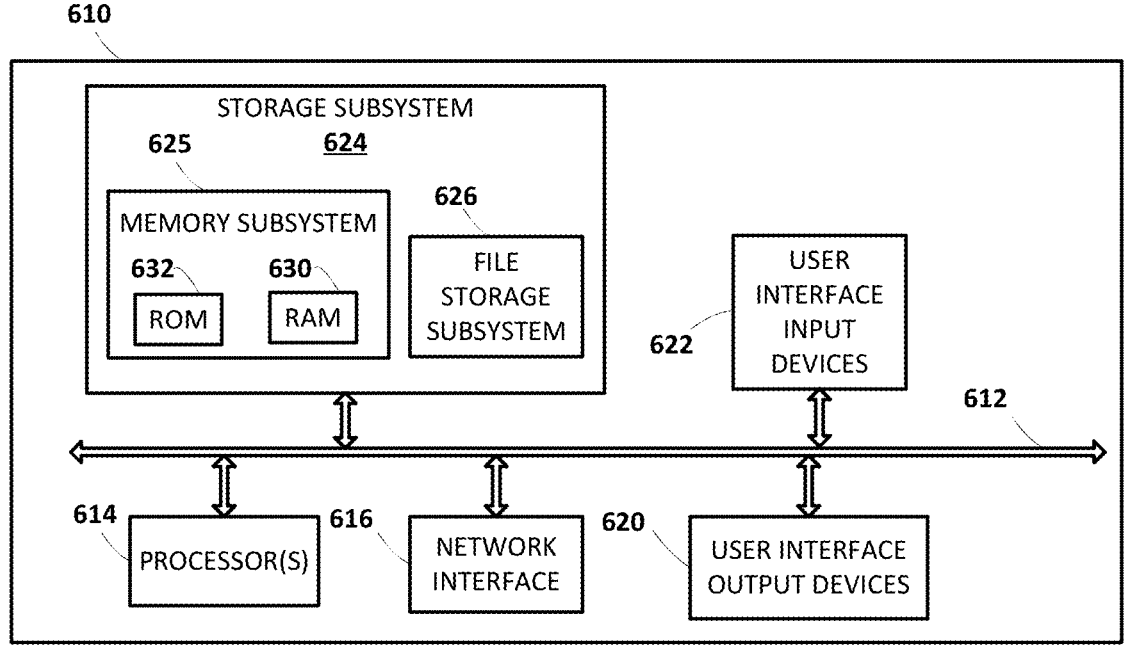
FIG. 6 depicts an example architecture of a computing device, in accordance with various implementations.

Turning now to FIG. 6, a block diagram of an example computing device 610 that may optionally be utilized to perform one or more aspects of techniques described herein is depicted. In some implementations, one or more of a client device, cloud-based automated assistant component(s) or other cloud-based software application component(s), and/or other component(s) can include one or more components of the example computing device 610.

Computing device 610 typically includes at least one processor 614 which communicates with a number of peripheral devices via bus subsystem 612. These peripheral devices can include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 can include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 can include the logic to perform selected aspects of the methods disclosed herein, as well as to implement various components depicted in FIG. 1.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem 612 can use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect or otherwise monitor personal information about users, or can make use of personal and/or monitored information), the users can be provided with an opportunity to control whether programs or features collect user information (e.g., information about a user's social network, social actions or activities, profession, a user's preferences, or a user's current geographic location), or to control whether and/or how to receive content from the content server that can be more relevant to the user. Also, certain data can be treated in one or more ways before it is stored or used, so that personal identifiable information is removed. For example, a user's identity can be treated so that no personal identifiable information can be determined for the user, or a user's geographic location can be generalized where geographic location information is obtained (such as to a city, ZIP code, or state level), so that a particular geographic location of a user cannot be determined. Thus, the user can have control over how information is collected about the user and/or used.

In some implementations, a method implemented by processor(s) is provided and includes receiving natural language (NL) based input associated with a client device. The method further includes, in response to receiving the NL based input: generating a subquery generation prompt that includes the NL based input and additional NL content that promotes subquery generation; generating a plurality of candidate subqueries for the NL based input based on processing the subquery generation prompt using generative model; and selecting, from the plurality of candidate subqueries and using one or more evaluation metrics, a subset of the candidate subqueries generated using the generative model. The method further includes, in response to receiving the NL based prompt and in response to selecting the subset of the candidate queries: obtaining, for each of the candidate subqueries of the subset, at least one corresponding search result; and generating a response to the NL based input based on the corresponding search results for the candidate subqueries of the subset. The method further includes causing the response to be rendered at the client device responsive to the NL based input.

These and other implementation of the technology disclosed herein can include one or more of the following features.

In some implementations, the additional NL content, of the subquery generation prompt, includes one or more few shot examples, each of the few shot examples including corresponding prior NL based input paired with corresponding previously determined subqueries for the corresponding prior NL based input. In some of those implementations, the subquery generation prompt comprises randomly selecting, from a superset of few shot examples, the one or more few shot examples for inclusion in the subquery generation prompt.

In some implementations, the method further includes generating an additional subquery generation prompt that includes the NL based input, that omits the additional NL content, and that includes alternative NL content that promotes subquery generation. In some versions of those implementations, generating the plurality of candidate subqueries for the NL based input includes generating some of the candidate subqueries based on processing, in a first iteration, the subquery generation prompt using the generative model or an alternative generative model, and generating other of the candidate subqueries based on processing, in a second iteration, the additional subquery generation prompt using the generative model or the alternative generative model. In some of those versions, the alternative NL content, of the additional subquery generation prompt, includes one or more alternative few shot examples, each of the alternative few shot examples including corresponding alternative prior NL based input paired with corresponding alternative previously determined subqueries for the corresponding alternative prior NL based input. Optionally, generating the additional subquery generation prompt comprises randomly selecting, from a superset of few shot examples, the one or more few shot examples for inclusion in the subquery generation prompt.

In some implementations, the one or more evaluation metrics that are utilized in selecting the subset of the candidate subqueries include a corresponding diversity metric for each of the candidate subqueries and/or a corresponding relatedness metric for each of the candidate subqueries. In some versions of those implementations, the one or more evaluation metrics that are utilized in selecting the subset of the candidate subqueries include the corresponding diversity metrics, and each of the corresponding diversity metrics characterizes diversity of the candidate subquery to any the candidate subqueries already selected for inclusion in the subset. In some implementations of those versions, the method further includes generating, using an encoding neural network model, a first encoding of a first subquery of the candidate subqueries and generating, using the encoding neural network model, a second encoding of the second subquery of the candidate subqueries. In those implementations of those versions, generating the corresponding diversity metric for the second subquery is based at least in part on a distance measure between the second encoding and the first encoding and the encoding neural network model is more computationally efficient than is the generative model. In some additional or alternative implementations of those versions, the one or more evaluation metrics that are utilized in selecting the subset of the candidate subqueries include the corresponding relatedness metrics, and each of the corresponding relatedness metrics characterizes relatedness of the candidate subquery to the NL based input. In some of those additional or alternative implementations, the method further includes generating, using an encoding neural network model, a first encoding of a first subquery of the candidate subqueries and generating, using the encoding neural network model, an NL based input encoding of the NL based input—where generating the corresponding relatedness metric for the first subquery is based at least in part on a distance measure between the first encoding and the NL based input encoding and where the encoding neural network model is more computationally efficient than is the generative model. In some further additional or alternative implementations of those versions, selecting the subset of the candidate subqueries includes selecting a given candidate subquery, for inclusion in the subset, in response to determining that: the corresponding diversity metric for the given candidate subquery satisfies a threshold, and the corresponding relatedness metric for the given candidate subquery satisfies the threshold or an alternative threshold.

In some implementations, generating the response to the NL based input based on the corresponding search results for the candidate subqueries of the subset includes generating the response to include, in the response, each of the corresponding search results visually separated from one another. In some versions of those implementations, generating the response to the NL based input based on the corresponding search results for the candidate subqueries of the subset includes generating the response to include, in the response, each of the candidate subqueries of the subset. In some of those versions, the response visually indicates, for each of the corresponding search results, a corresponding correlation to a corresponding one of the candidate subqueries of the subset based on which the corresponding search result is obtained.

In some implementations, generating the response to the NL based input based on the corresponding search results for the candidate subqueries of the subset includes processing the search results, using the generative model or an additional generative model, to generate a shortened summary of the search results and including, in the response, the shortened summary of the search results.

In some implementations, the method further includes, in response to receiving the NL based input, determining, based on one or more criteria, whether to generate and execute multiple subqueries based on the NL based input. In those implementations, generating the subquery generation prompt, generating the plurality of candidate subqueries, selecting the subset of the candidate subqueries, obtaining the corresponding search results, generating the response to the NL based input based on the corresponding search results, and/or causing the response to be rendered at the client device responsive to the NL based input are only performed in response to determining to generate and execute the multiple subqueries based on the NL based input. In some of those implementations the one or more criteria include a length criterion that is based on a quantity of tokens of the NL based input, one or more search result quality criteria, and/or a current server load criterion. For example, the one or more criteria can include a length criterion that is a length threshold and determining to generate and execute the multiple subqueries is based on the quantity of tokens being greater than the length threshold. As another example, the one or more criteria can additionally or alternatively include one or more search criteria that are based on a frequency of submission of the NL based input and/or that are based on one or more metrics for one or more search results that are responsive to the NL based input in its entirety.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more computer readable storage media (e.g., transitory and/or non-transitory) storing computer instructions executable by one or more processors to perform any of the aforementioned methods. Some implementations also include a computer program product including instructions executable by one or more processors to perform any of the aforementioned methods.

What is claimed is:

1. A method implemented by one or more processors, the method comprising:

receiving natural language (NL) based input associated with a client device;

in response to receiving the NL based input:

generating a subquery generation prompt that includes the NL based input and additional NL content that promotes subquery generation;

generating a plurality of candidate subqueries for the NL based input based on processing the subquery generation prompt using a generative model;

selecting, from the plurality of candidate subqueries and using one or more evaluation metrics, a subset of the candidate subqueries generated using the generative model, wherein the one or more evaluation metrics that are utilized in selecting the subset of the candidate subqueries include a corresponding diversity metric for each of the candidate subqueries and/or a corresponding relatedness metric for each of the candidate subqueries;

in response to selecting the subset of the candidate queries:

obtaining, for each of the candidate subqueries of the subset, at least one corresponding search result; and generating a response to the NL based input based on the corresponding search results for the candidate subqueries of the subset; and causing the response to be rendered at the client device responsive to the NL based input.

2. The method of claim 1, wherein the additional NL content, of the subquery generation prompt, includes one or more few shot examples, each of the few shot examples including corresponding prior NL based input paired with corresponding previously determined subqueries for the corresponding prior NL based input.

3. The method of claim 2, wherein generating the subquery generation prompt comprises randomly selecting, from a superset of few shot examples, the one or more few shot examples for inclusion in the subquery generation prompt.

4. The method of claim 1, further comprising:
   generating an additional subquery generation prompt that includes the NL based input, that omits the additional NL content, and that includes alternative NL content that promotes subquery generation;
   wherein generating the plurality of candidate subqueries for the NL based input comprises:
      generating some of the candidate subqueries based on processing, in a first iteration, the subquery generation prompt using the generative model or an alternative generative model, and
      generating other of the candidate subqueries based on processing, in a second iteration, the additional subquery generation prompt using the generative model or the alternative generative model.

5. The method of claim 4, wherein the alternative NL content, of the additional subquery generation prompt, includes one or more alternative few shot examples, each of the alternative few shot examples including corresponding alternative prior NL based input paired with corresponding alternative previously determined subqueries for the corresponding alternative prior NL based input.

6. The method of claim 5, wherein generating the additional subquery generation prompt comprises randomly selecting, from a superset of few shot examples, the one or more alternative few shot examples for inclusion in the additional subquery generation prompt.

7. The method of claim 1, wherein the one or more evaluation metrics that are utilized in selecting the subset of the candidate subqueries include the corresponding diversity metrics.

8. The method of claim 7, wherein each of the corresponding diversity metrics characterizes diversity of the candidate subquery to any of the candidate subqueries already selected for inclusion in the subset.

9. The method of claim 8, further comprising:
   generating, using an encoding neural network model, a first encoding of a first subquery of the candidate subqueries; and
   generating, using the encoding neural network model, a second encoding of a second subquery of the candidate subqueries;
   wherein generating the corresponding diversity metric for the second subquery is based at least in part on a distance measure between the second encoding and the first encoding; and
   wherein the encoding neural network model is more computationally efficient than is the generative model.

10. The method of claim 1, wherein the one or more evaluation metrics that are utilized in selecting the subset of the candidate subqueries include the corresponding relatedness metrics, and wherein each of the corresponding relatedness metrics characterizes relatedness of the candidate subquery to the NL based input.

11. The method of claim 10, further comprising:
   generating, using an encoding neural network model, a first encoding of a first subquery of the candidate subqueries; and generating, using the encoding neural network model, an NL based input encoding of the NL based input;
   wherein generating the corresponding relatedness metric for the first subquery is based at least in part on a distance measure between the first encoding and the NL based input encoding; and
   wherein the encoding neural network model is more computationally efficient than is the generative model.

12. The method of claim 7, wherein selecting the subset of the candidate subqueries includes selecting a given candidate subquery, for inclusion in the subset, in response to determining that:
   the corresponding diversity metric for the given candidate subquery satisfies a threshold, and
   the corresponding relatedness metric for the given candidate subquery satisfies the threshold or an alternative threshold.

13. The method of claim 1, wherein generating the response to the NL based input based on the corresponding search results for the candidate subqueries of the subset includes:
   generating the response to include, in the response, each of the corresponding search results visually separated from one another.

14. The method of claim 13, wherein generating the response to the NL based input based on the corresponding search results for the candidate subqueries of the subset includes:
   generating the response to include, in the response, each of the candidate subqueries of the subset.

15. The method of claim 14, wherein the response visually indicates, for each of the corresponding search results, a corresponding correlation to a corresponding one of the candidate subqueries of the subset based on which the corresponding search result is obtained.

16. The method of claim 1, wherein generating the response to the NL based input based on the corresponding search results for the candidate subqueries of the subset includes:
   processing the search results, using the generative model or an additional generative model, to generate a shortened summary of the search results; and
   including, in the response, the shortened summary of the search results.

17. The method of claim 1, further comprising:
   in response to receiving the NL based input:
      determining, based on one or more criteria, whether to generate and execute multiple subqueries based on the NL based input;
      wherein generating the subquery generation prompt, generating the plurality of candidate subqueries, selecting the subset of the candidate subqueries, obtaining the corresponding search results, generating the response to the NL based input based on the corresponding search results, and/or causing the response to be rendered at the client device responsive to the NL based input are only performed in response to determining to generate and execute the multiple subqueries based on the NL based input.

18. The method of claim 17, wherein the one or more criteria include a length criterion that is based on a quantity of tokens of the NL based input.

19. The method of claim 17, wherein the one or more criteria include one or more search result quality criteria.

20. The method of claim 17, wherein the one or more criteria include a current server load criterion.

21. A system comprising:

one or more hardware processors; and memory storing instructions that, when executed by the one or more hardware processors, cause the one or more hardware processors to:

receive natural language (NL) based input associated with a client device;

in response to receiving the NL based input:

generate a subquery generation prompt that includes the NL based input and additional NL content that promotes subquery generation;

generate a plurality of candidate subqueries for the NL based input based on processing the subquery generation prompt using a generative model;

select, from the plurality of candidate subqueries and using one or more evaluation metrics, a subset of the candidate subqueries generated using the generative model, wherein the one or more evaluation metrics that are utilized in selecting the subset of the candidate subqueries include a corresponding diversity metric for each of the candidate subqueries and/or a corresponding relatedness metric for each of the candidate subqueries;

in response to selecting the subset of the candidate queries:

obtain, for each of the candidate subqueries of the subset, at least one corresponding search result; and generate a response to the NL based input based on the corresponding search results for the candidate subqueries of the subset; and cause the response to be rendered at the client device responsive to the NL based input.

22. The system of claim 21, wherein the one or more evaluation metrics that are utilized in selecting the subset of the candidate subqueries include the corresponding relatedness metrics, and wherein each of the corresponding relatedness metrics characterizes relatedness of the candidate subquery to the NL based input.

23. The system of claim 22, wherein the instructions, when executed by the one or more hardware processors, further cause the one or more hardware processors to:

in response to receiving the NL based input:

determine, based on one or more criteria, whether to generate and execute multiple subqueries based on the NL based input;

wherein generating the subquery generation prompt, generating the plurality of candidate subqueries, selecting the subset of the candidate subqueries, obtaining the corresponding search results, generating the response to the NL based input based on the corresponding search results, and/or causing the response to be rendered at the client device responsive to the NL based input are only performed in response to determining to generate and execute the multiple subqueries based on the NL based input.

24. A method implemented by one or more processors, the method comprising:

receiving natural language (NL) based input associated with a client device;

in response to receiving the NL based input:

generating a subquery generation prompt that includes the NL based input and additional NL content that promotes subquery generation;

generating a plurality of candidate subqueries for the NL based input based on processing the subquery generation prompt using a generative model;

selecting, from the plurality of candidate subqueries and using one or more evaluation metrics, a subset of the candidate subqueries generated using the generative model;

in response to selecting the subset of the candidate queries:

obtaining, for each of the candidate subqueries of the subset, at least one corresponding search result; and generating a response to the NL based input based on the corresponding search results for the candidate subqueries of the subset, wherein generating the response to the NL based input based on the corresponding search results for the candidate subqueries of the subset includes:

processing the search results, using the generative model or an additional generative model, to generate a shortened summary of the search results; and including, in the response, the shortened summary of the search results; and causing the response to be rendered at the client device responsive to the NL based input.

25. The method of claim 24, wherein the one or more evaluation metrics that are utilized in selecting the subset of the candidate subqueries include a corresponding relatedness metric for each of the candidate subqueries.

26. The method of claim 25, wherein each of the corresponding relatedness metrics characterizes relatedness of the candidate subquery to the NL based input.

27. The method of claim 24, further comprising:

in response to receiving the NL based input:

determining, based on one or more criteria, whether to generate and execute multiple subqueries based on the NL based input;

wherein generating the subquery generation prompt, generating the plurality of candidate subqueries, selecting the subset of the candidate subqueries, obtaining the corresponding search results, generating the response to the NL based input based on the corresponding search results, and/or causing the response to be rendered at the client device responsive to the NL based input are only performed in response to determining to generate and execute the multiple subqueries based on the NL based input.

28. A method implemented by one or more processors, the method comprising:

receiving natural language (NL) based input associated with a client device;

in response to receiving the NL based input:

generating a subquery generation prompt that includes the NL based input and additional NL content that promotes subquery generation;

determining, based on one or more criteria, whether to generate and execute multiple subqueries based on the NL based input;

generating a plurality of candidate subqueries for the NL based input based on processing the subquery generation prompt using a generative model;

selecting, from the plurality of candidate subqueries and using one or more evaluation metrics, a subset of the candidate subqueries generated using the generative model;

in response to selecting the subset of the candidate queries:

obtaining, for each of the candidate subqueries of the subset, at least one corresponding search result; and generating a response to the NL based input based on the corresponding search results for the candidate subqueries of the subset; and causing the response to be rendered at the client device responsive to the NL based input;

wherein generating the subquery generation prompt, generating the plurality of candidate subqueries, selecting the subset of the candidate subqueries, obtaining the corresponding search results, generating the response to the NL based input based on the corresponding search results, and/or causing the response to be rendered at the client device responsive to the NL based input are only performed in response to determining to generate and execute the multiple subqueries based on the NL based input.

*     *     *     *     *